Oct. 21, 1952   C. L. EKSERGIAN   2,614,507
RAILWAY TRUCK

Filed Aug. 19, 1946   4 Sheets-Sheet 1

INVENTOR
Carolus L. Eksergian
BY
*Donald B. Waite*
ATTORNEY

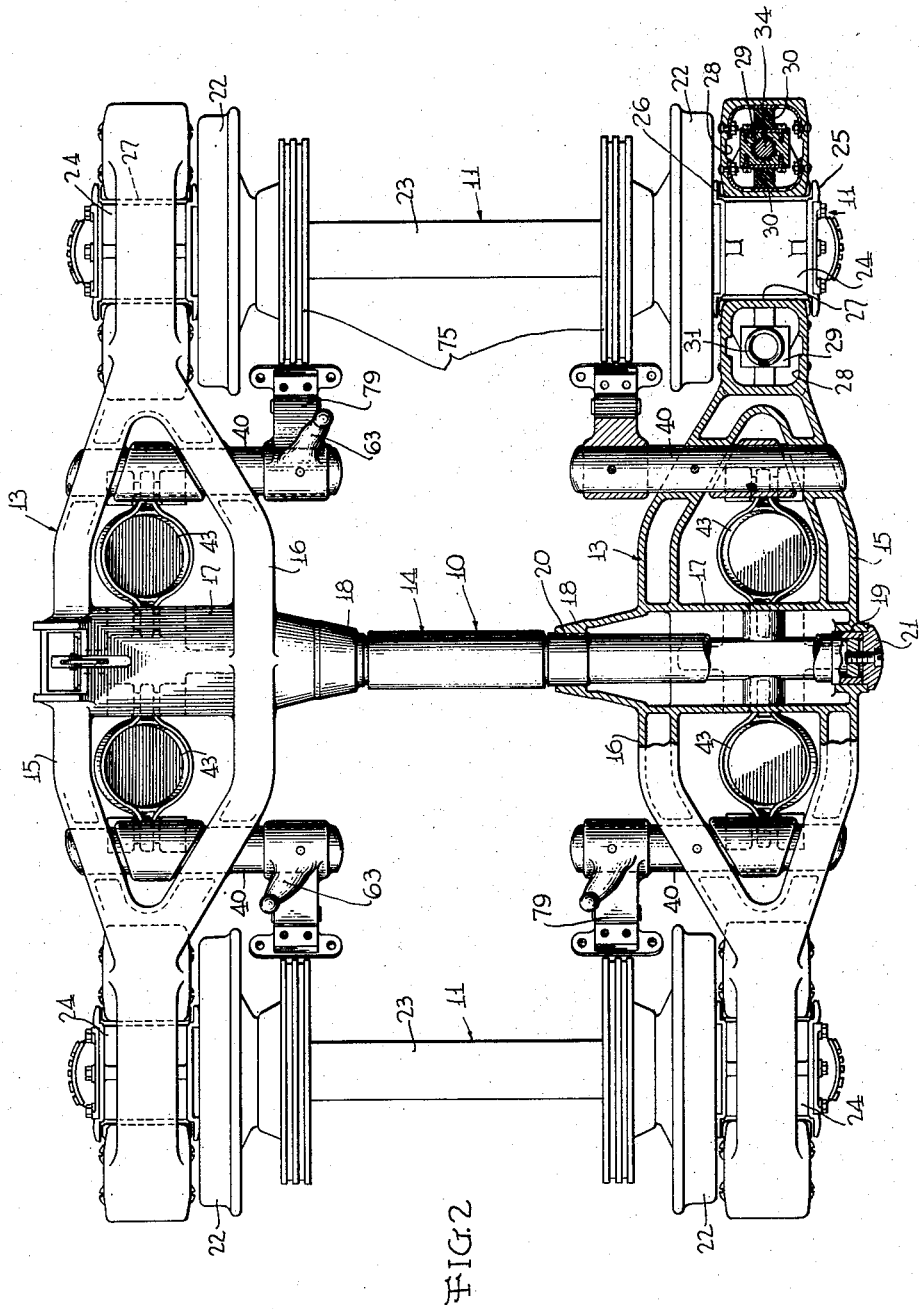

Oct. 21, 1952　　　C. L. EKSERGIAN　　　2,614,507
RAILWAY TRUCK
Filed Aug. 19, 1946　　　　　　　　　　　　4 Sheets-Sheet 3
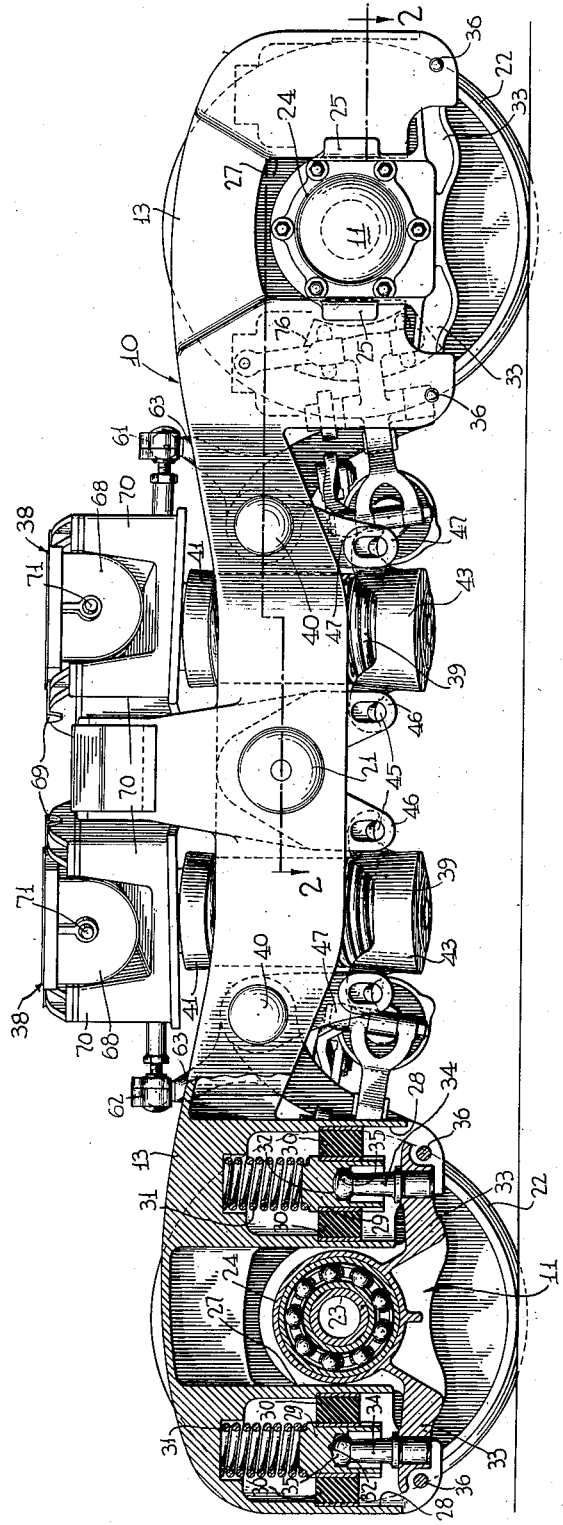
INVENTOR
Carolus L. Eksergian
BY
*Ronald B. Wait*
ATTORNEY Oct. 21, 1952  C. L. EKSERGIAN  2,614,507
RAILWAY TRUCK
Filed Aug. 19, 1946  4 Sheets-Sheet 4
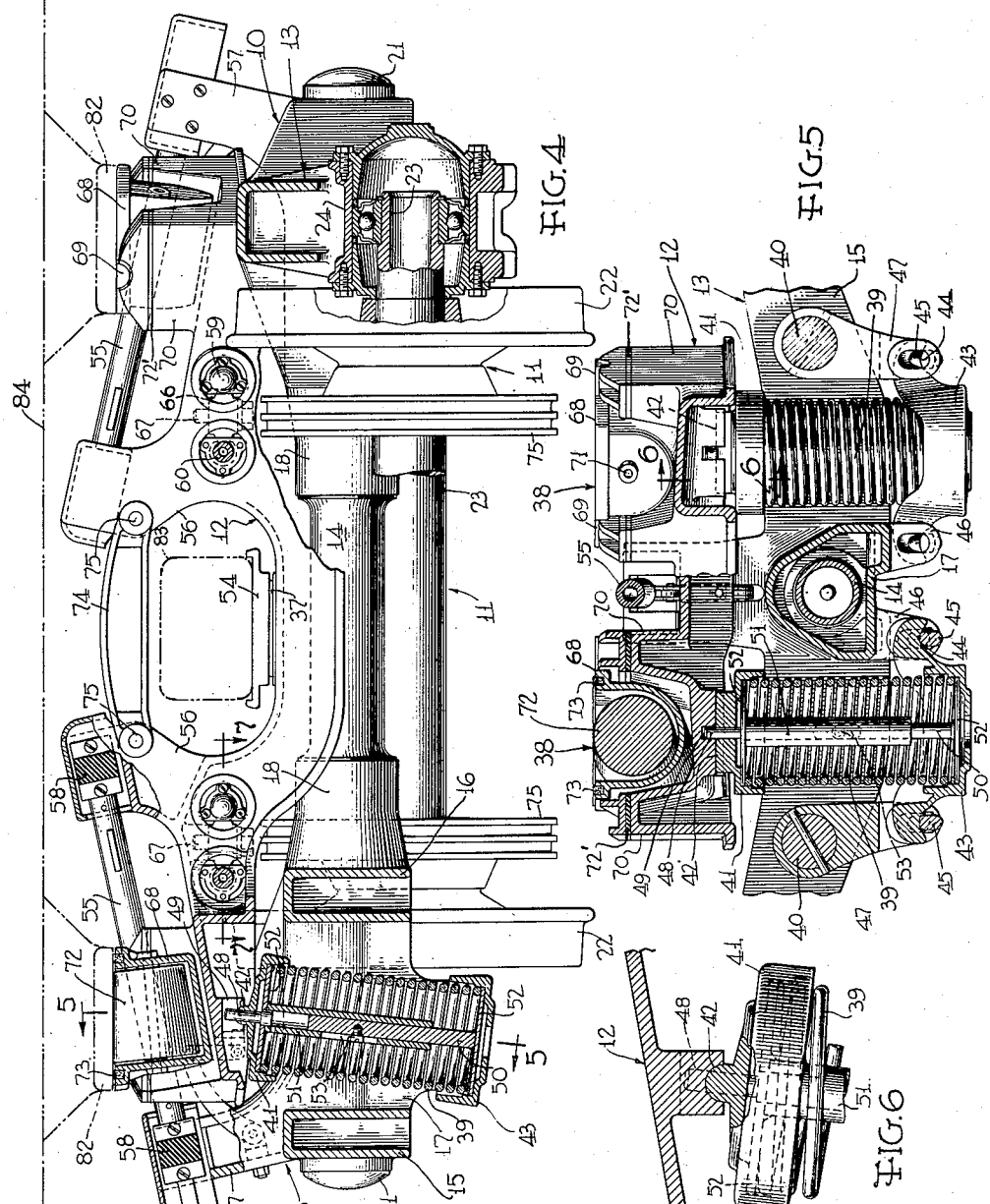
INVENTOR
Carolus L. Eksergian
BY
Donald B. Waite
ATTORNEY Patented Oct. 21, 1952

2,614,507

UNITED STATES PATENT OFFICE 2,614,507

RAILWAY TRUCK

Carolus L. Eksergian, Detroit, Mich., assignor to The Budd Company, Philadelphia, Pa., a corporation of Pennsylvania Application August 19, 1946, Serial No. 691,426

7 Claims. (Cl. 105—197)

The invention relates to wheeled vehicles and more particularly to railway trucks.

It is among the objects of the invention to provide a railway truck well-adapted for use in modern high-speed passenger cars, one which is light in weight, has easy riding qualities, and is sturdy and strong while relatively simple in construction thus assuring it of safety in operation and long life with a minimum of lay up for repair and replacement, all of which features are desirable to reduce costs and increase the operating revenues of the railways upon which it is intended to be used.

Lightness in weight and simplicity of construction are achieved by dispensing with separate equalizers in addition to the usual truck frame and making the frame itself serve as the equalizers while also serving the usual purpose of the frame in maintaining the wheels in tram. To this end the frame comprises primarily two side frames, having transversely widened central portions which are connected together by a main transverse member or transom, having a connection to said side frame members of such transverse extent as to insure maintaining the wheels in tram. At least one of the ends of said transverse member is connected to that one of the side frames associated with it by widely transversely spaced bearings permitting relative rotary movement between said side frame and transom and between said side frame and the other side frame to permit the carrying of the load on the frame equally to all four wheels irrespective of track irregularities.

The ends of the truck frame are supported by the usual spaced wheel and axle assemblies, but the connection between the wheel and axle assemblies and the side frames is such as to permit limited yieldingly restrained relative lateral, longitudinal, vertical or tilting movement of the assembly with respect to the frame, so that no binding will result upon relative tilting of the side frames or upon tilting of the axles with respect to the side frames, and the longitudinal, vertical and lateral forces acting on the frame will be cushioned, except in cases of excessive relative movement, when the parts will engage each other in solid metal-to-metal engagement to prevent the overstressing of the yielding means.

The connection between the wheel and axle assembly and the frame is further such as to simplify the journal box and permit ready assembly and disassembly of the wheel and axle assembly with the frame.

The bolster and bolster suspension are simplified by the omission of the usual spring plank supported for transverse movement on hangers depending from the frame. Substantially all the springing is taken between the bolster and the frame through long low rate coil springs which assure an easy ride. These springs have their upper ends seated in bearing cups pivotally mounting the bolster while their lower ends are seated in bearing cups swingingly suspended from the side frames by knife edge bearings. The springs are downwardly and outwardly inclined and move with the lateral movements of the bolster without any bending force being exerted on the lengths thereof. To provide a low suspension of the bolster and to transmit the loads symmetrically to the side frames, the side frames are split in their central portions into two spaced branches, between which the springs are received and extend some distance below the side frames.

The soft low rate springs insure easy riding qualities on the straight away, but in rounding curved tracks at high speed, because of their free action, the bolster tends to tip sideways toward the outside of the curve causing an undesired roll of the body supported thereby. The manner in which the load is transmitted to the bolster and its side movement cushioned removes in large part this tendency to roll.

The center plate of the bolster is placed at a low level and the ends of the bolster directly over the springs are provided with anti-friction side bearings directly carrying the main portion of the car body load from side bearings on the car body. The central portion of the bolster can therefore be made considerably lighter, since it is subjected to very little vertical load. It need be strong enough only to take the longitudinal and lateral forces acting between the car and truck center plates.

The tendency to lateral roll of the bolster is further minimized by the high inclined location of the thrust rods which transmit lateral forces from the bolster to the side frames, these thrust-rods being located well above the center plate and approaching the center of gravity of a car body mounted on the truck. Suitable cushioning means is provided in the connections of these thrust rods to the frame and to the bolster to cushion the lateral shocks and yet allow the vertical movement of the bolster with respect to the frame in accordance with the yielding of the coil springs supporting it.

The longitudinal movement of the bolster with respect to the frame is restrained by novel means acting substantially in the horizontal plane of the truck center plate. On each side of the center plate are provided for this purpose longitudinally extending thrust rods, one extending from each side of the bolster to a connection to the frame and the ends of the rods adjacent the bolster are secured to it through an equalizing lever pivoted to the bolster. Thus both rods aid in resisting longitudinal movement of the bolster, one being in tension and the other in compression, resulting in an equalized distribution of the forces. To avoid interference with the vertical movements of the bolster, the rods are articulated at each end through universal joints.

The side bearings are designed to permit easy turning of the truck under the car body, and comprise rollers trunnioned in casings open at the top and mounted on the bolster to turn on axes arranged at right angles to the roller trunnions. The rollers project but slightly from the open tops of the respective casings, which are arranged to form a continuous margin around these rollers, in close proximity to the flat car body side bearing which is engaged by the rollers. Suitable sealing means extend around the opening to seal the space between its margin and the car body side bearing against the entrance of foreign matter to the rollers. This seal also brushes off any dirt on the body side bearing before it engages the rollers, thus reducing wear on the rollers and side bearing.

To further reduce wear on the rollers, such as would be caused by slight relative lateral movement of the car body in the direction of the roller axis, the roller casings are yieldingly mounted to allow such lateral movement without sliding of the body side bearing on the rollers.

The foregoing objects and advantages and others not specifically mentioned will appear from the following detailed description when read in connection with the accompanying drawings forming a part of this specification.

In the drawings, in which the invention is more or less diagrammatically shown,

Fig. 2 is a similar view of the truck frame with the bolster and other parts removed, and with parts of the frame broken away and shown in horizontal section taken substantially along the line 2—2 of Fig. 3.

Fig. 3 is a side elevational view, on an enlarged scale, with parts broken away and shown in vertical section taken substantially along the line 3—3 of Fig. 1.

Fig. 4 is an end elevational view with parts broken away and shown in section;

Fig. 5 is a fragmentary side elevational view, with parts in section showing the bolster springing, parts being shown in section substantially along the line 5—5 of Fig. 4.

Fig. 6 is a detail view, parts being shown in section substantially along the line 6—6 of Fig. 5 and Fig. 7 is a fragmentary detail sectional plan view showing the connection of the longitudinal restraining means to the bolster, the section being taken substantially along the line 7—7 of Fig. 4.

Figure 1:
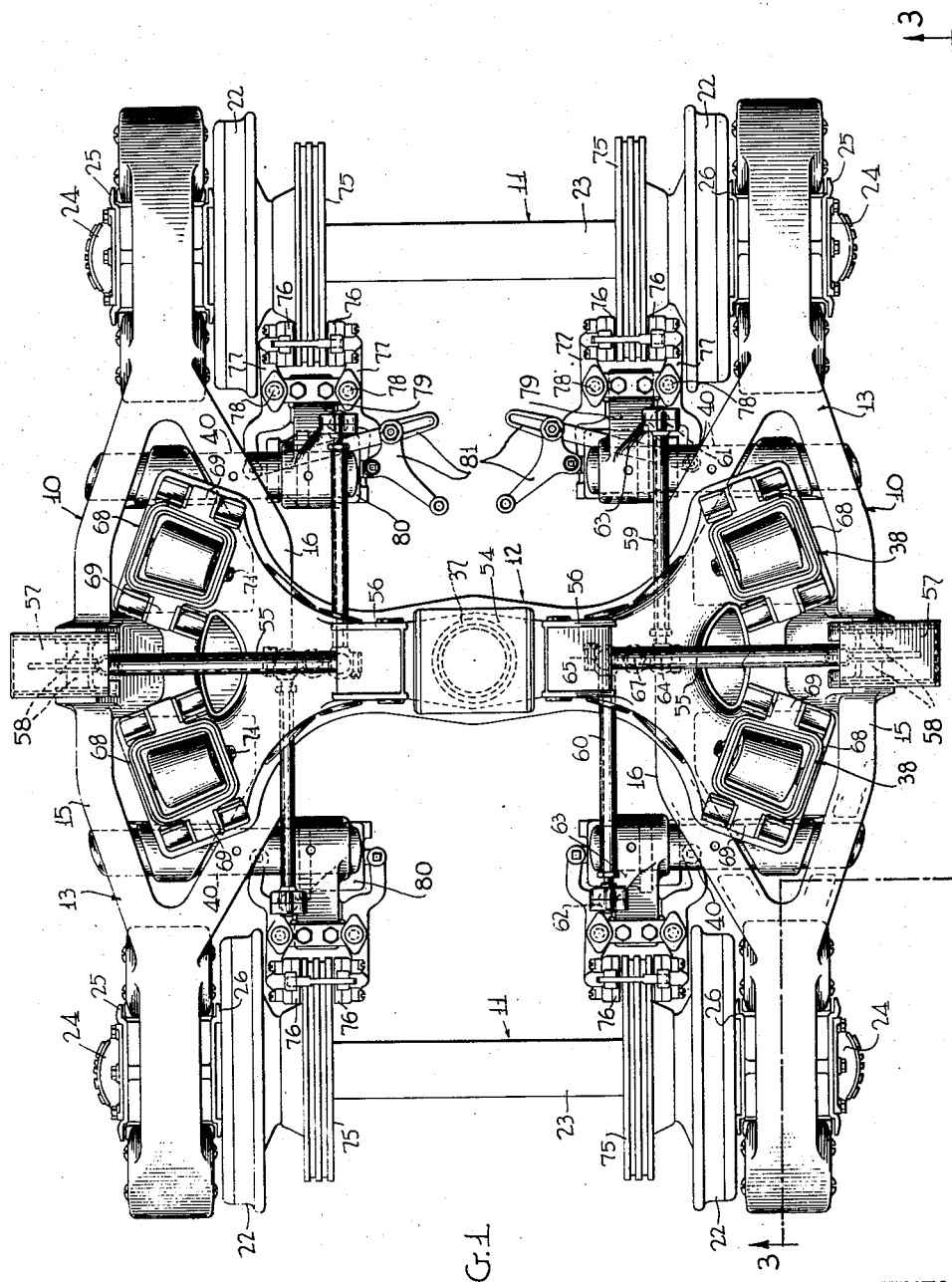
Fig. 1 is a plan view of the truck.

In the drawings, the invention is shown as applied to a model truck constructed to show the main features of the invention and it will be understood that certain of the details shown would be departed from in the construction of a practical full-size truck. The specific detail hereinafter described should be considered merely as illustrative and not as representing an actual embodiment of the invention in a full-size railway truck.

The truck frame is designated generally by the numeral 10, the wheel and axle assemblies at the opposite ends of the truck by 11 and the bolster by 12. These four elements constitute the main structural members of the truck.

The truck frame which serves also as equalizer frame is constituted of two spaced longitudinally extending side frame members 13 transversely interconnected adjacent their ends by the wheel and axle assemblies and centrally by a strong tubular transverse member or transom 14.

The side frames may be, as shown, of hollow box section construction and they are preferably widened transversely in their central portions by being split into outer and inner spaced branches 15 and 16, see Fig. 2, which are joined together centrally by a transverse member 17 extending inwardly beyond the inner branch 16 by an extension 18. This wide central portion of the side frame provides widely spaced outer and inner bearings 19 and 20 for engagement with the transom 14 for holding the truck frame in tram. At least one of the side frames is rotatable about these bearings to allow the wheels to follow the track irregularities and equalize the loads thereon. The side frames can be readily disassembled by removing the thrust cap 21 secured to the end of the transom 17 in any convenient manner. The widened branched arrangement of the central portions of the side frames also cooperates with the bolster suspension in a manner to be subsequently described.

The wheel and axle assemblies each may comprise the wheels 22, axle 23, and journal boxes 24 mounting the axles in suitable anti-friction bearings. The journal boxes are provided with outer and inner abutments 25 and 26 which are normally free of engagement with the side frame adjacent thereto but are adapted to positively limit excessive lateral movement of the assembly in the frame.

Each journal box is received in a vertical slot 27 adjacent the end of the associated side frame with a certain amount of play, so that it is capable of limited relative movement with respect to the frame in all directions. Such movement is however, restrained by the manner in which the frame is mounted on the journal box.

Referring now to Figs. 2 and 3, it will be seen that the side frame is provided fore and aft of each journal box with vertical downwardly open recesses 28. Each recess has yieldingly mounted therein an abutment 29 which is universally movable but is yieldingly restrained against such movement by suitable means, such as the rubber-like cushions 30 disposed fore and aft of the abutment 29 and between it and the walls of the recess 28. These cushions are designed to restrain vertical, transverse and longitudinal movements of the abutment, the vertical and transverse movements being opposed by the rubber in shear and the longitudinal movements by the rubber in compression. Vertical movement may be further restrained, if desired, by a coil spring as 31, interposed between the abutment 29 and the top of the associated recess 28.

The abutment 29 is provided with a downwardly open reentrant portion formed at its inner or upper end with a parti-spherical seat 32. The journal box is formed in its lower portion with fore and aft extensions 33, adjacent the ends of which are secured vertical projections 34.

Each projection is designed to extend upwardly into the reentrant portion of the associated abutment, and has a parti-spherical head 35 arranged to seat in the correspondingly formed seat 32 of the abutment. This interseating engagement is preferably arranged substantially in the horizontal plane of the adjacent axle 23 to minimize the turning moment on the journal box 24.

This mounting of the journal box in the side frame provides for restrained limited universal movements between these parts, which is desirable to prevent binding and excessive strain between the parts when operating over track irregularities and otherwise. It also provides for the easy assembly and disassembly of the wheel and axle assembly with the side frame. It also provides for a low slung mounting of the frame with respect to the wheel and axle assemblies which in turn permits a low level truck center plate. By removing the safety bolts 36 extending under the ends of the journal box extensions 33, the parts can be readily separated by relative vertical movement.

The bolster 12 has a low level central portion carrying the center plate 37 and side portions which are widened longitudinally to carry in their upper portions the longitudinally spaced side bearings, generally designated 38. Directly below the side bearings which are arranged substantially at the longitudinal center line of the respective side frames, is provided the spring suspension for the respective ends of the bolster.

Such suspension at each side of the truck preferably comprises a pair of long low spring rate steel coil springs 39, one located under each side bearing, and each extending downwardly between the spaced branches of the associated side frame and some distance therebelow. The springs 39 at one end of the bolster are arranged on opposite sides of the central transverse member 17 of the adjacent side frame, see Fig. 5, and on the opposite sides of the springs from this member 17 are arranged transverse members 40 interconnecting the outer and inner branches of the side frame. These members 40 are extended inwardly some distance beyond the respective side frame, see Fig. 1, for a purpose to be later described.

To permit the free transverse movement of the bolster without imposing bending stress upon the springs, the springs are pivotally mounted both with respect to the bolster and the frame. To this end the upper ends of the springs seat in cup seats 41 which engage the bolster through a parti-cylindrical bearing 42, see Fig. 6, and their lower ends bear in cup seats 43 which are swung through knife edge bearings 44 from transverse bars 45 offset downwardly in their central portions and supported at their ends in downwardly extending brackets 46 carried, on the one hand, by the central transverse member 17 of the adjacent side frame and, on the other hand by, the downwardly extending brackets 47, secured to the transverse members 40, all as clearly appears in Fig. 5. To prevent lengthwise shifting of the upper bearing 42, a suitable pin 48 may be provided on the spring cap 41 extending into a transverse groove 49 on the bolster part of the bearing 42.

To hold each spring assembly in assembled relation when removed from the truck, means are provided for limiting the expansion of the spring, which means are shown as comprising a telescoping pin 50 and sleeve 51 each having a head 52 seated under the respective ends of the spring. The relative movement between the pin and sleeve is limited by a pin and slot connection 53 therebetween, see Fig. 4.

The spring arrangement just described provides a low slung suspension of the bolster and one which does not interfere with the transverse movements of the bolster and places no bending stress on the springs in such transverse movement. Since the springing of the loads is substantially entirely through these soft low rate springs, easy riding qualities are assured.

The invention contemplates, to further the easy riding qualities of the truck and to minimize lateral tilting or roll of the bolster and the body supported thereby (the latter having its center plate 54 shown in full line in Figs. 1 and 4 resting on the truck center plate 37), which roll is likely to take place in rounding track curves at high speed, the provision of means to minimize such roll. Such means are shown as high level outwardly and downwardly inclined struts 55, one for each side of the truck, such struts being secured at their inner ends to upward extensions 56 on the bolster, one on each side of the center plate 37, and at their outer ends to outboard upward extensions 57 on the respective side frames. The ends of these struts are suitably cushioned in their connections to the bolster and the respective side frames, as by rubber cushions indicated at 58, and stressed in shear upon lateral movement of the bolster.

The high level location of these inclined struts well above the truck center plate and approaching the center of gravity (not shown) of the car body mounted thereon reduces the turning moment causing body roll and thereby minimizes such tendency.

The invention further contemplates novel means for transmitting the longitudinal forces between the bolster and the truck frame. Such means is most clearly shown in Figs. 1, 4 and 7. Since the means is similar at both ends of the bolster, a description of one will suffice. It comprises two laterally offset longitudinally extending struts 59 and 60, one extending toward one end of the truck from the bolster and the other toward the other end. The remote ends of the struts are secured by universal joints 61 and 62, respectively, to brackets 63 secured, respectively, to the inward extensions of the transverse members 40 on the associated side frame.

The adjacent ends of the struts, as clearly shown in Fig. 7, are secured by universal joints 64 and 65, respectively, to the opposite ends of an equalizing lever 66, which is pivoted on a vertical pivot 67 on the bolster substantially in the horizontal plane of the center plate thereof. With this arrangement, it will be seen that the bolster is free to move vertically with the varying load but is positively restrained from longitudinal movement, the two struts at each side of the truck preventing this by one operating in tension while the other operates in compression, the equalizer distributing the forces between them.

Since most of the load is intended to be carried by the side bearings 38, the central portion of the bolster 12 can be made relatively light since it is required to carry only the longitudinal and lateral forces between it and the body center plate 54.

The side bearings involve novel construction designed to permit freedom of swivelling movement between truck and body and to insure ease of assembly of the bearings with the truck and long life of the bearings. According to the invention, each side bearing comprises an upwardly open casing 68 swivelly supported by trunnions 69 arranged to seat in open top bearings on spaced upward extensions 70 on the bolster. Within each casing 68 is pivoted, on radially extending pivots 71, a roller 72 which is adapted to roll on the flat side bearing 82 of a body normally supported on the truck (see Fig. 4, which shows the side bearings 82, center sill 83 and floor clearance line 84 of such body in dot-and-dash lines).

To permit the rollers to follow the slight lateral movements of the body with respect the truck, as permitted by the slight play in the interengaging center plates, without sliding on the rollers, cushioning means are provided in the roller support to allow the rollers to partake of such slight lateral movements. Such cushioning means are shown as a slab of rubber 72' or the like, inserted between the trunnion support for the roller casing 68 and the upward extensions 70 on the bolster carrying said support, see Fig. 5. The rubber may be vulcanized or otherwise secured to the parts which it interconnects, so that it acts in shear in such relative lateral movement. This minimizes the wear on the rollers.

To further prolong the life of the rollers, the open top of the casing 68 is provided entirely around its margin with a sealing means, such as a suitable yielding packing 73 pressed into a groove in the margin of the casing and extending slightly thereabove. This arrangement effects a seal between the casing 68 and the flat face of the car side bearing resting on the roller and prevents the entrance of dirt or other foreign matter into the casing, and between the roller and the car body side bearing. Thus wear on the rollers is further minimized.

With the truck bolster constructed as described, safety means to hold the truck and body center plates in assembled relation may readily be provided. It may consist of a safety bar 74 extending over the body center sill 83, Fig. 4, and removably secured at its opposite ends by suitable securing pins or bolts as 75 to the upward extensions 56 of the bolster.

The brake mechanism may readily be applied to the truck. Each wheel has secured to its inner side a brake disc, as 75, with the opposite sides of which are arranged to cooperate the segmental shoes 76, carried by respective brake levers 77, each pivoted through a pivot, as 78 to a bracket 79 secured to the inward extension of the adjacent transverse member 40. The levers are designed to be actuated by a floating cylinder and piston 80 disposed between them and at one end of the truck, in addition by, manually actuated lever linkage 81.

While the invention has been herein described as embodied in a specific truck construction, it will be understood that changes and modifications may be made by those skilled in the art without departing from the main features of the invention, and such changes and modifications are intended to be covered in the appended claims.

What is claimed is:
1. In a railway truck, spaced side frames supported adjacent their ends by wheels, each side frame being split into two spaced inner and outer branches to form a widened central portion, a transverse member interconnecting the mid-portions of said branches and other fore and aft transverse members spaced from said first transverse member also interconnecting said branches, the widened central portions of the side frames being interconnected by a through-running member extending from side to side of the truck, said fore and aft transverse members extending inwardly some distance beyond the inner of said branches and forming, through their respective inner end portions, a support for the brake mechanism associated with the adjacent wheels.

2. In a railway truck, a pair of side frames supported at their ends by wheels, a transom interconnecting the central portions of said side frames, the central portions of said side frames being split to form spaced branches, and a bolster sprung from said side frames through coil springs extending through the space between said branches and some distance therebelow, the upper ends of said springs each engaging a seat pivoted on the bolster and the lower ends engaging a seat seated on longitudinally extending knife edge bearings supported by the frame.

3. In a railway truck, a pair of side frames supported at their ends by wheels, a transom interconnecting the central portions of said side frames, a bolster sprung from said side frames by coil springs, said bolster having a projection at each side of its center plate projecting a substantial distance thereabove and each side frame having an upwardly extending projection in transverse alignment with the adjacent bolster projection, and cushioned thrust means interconnecting the bolster projections to the respective side frame projections to carry the lateral thrusts of the bolster to the side frames.

4. In a railway truck, spaced side frames supported adjacent their ends by wheels, a transverse member interconnecting the side frames in their intermediate portions, short transverse members carried by said side frames fore and aft of said transverse member and projecting inwardly some distance beyond the respective side frames, a bolster sprung from said side frames, and longitudinal movement restraining means for said bolster including an equalizer lever pivoted intermediate its ends to the bolster, the opposite ends of said lever being anchored by tension and compression struts to said inwardly projecting portions of said short transverse members.

5. In a railway truck, spaced side frames supported adjacent their ends by wheels, a transom interconnecting said side frames, a bolster sprung from said side frames by laterally and downwardly inclined springs, short transverse members connected to said side frames fore and aft of said bolster and longitudinal movement restraining means for said bolster, said short transverse members serving as anchorages for lower spring seats of the bolster supporting springs and as anchorages for said longitudinal movement restraining means.

6. In a railway truck, spaced side frames supported adjacent their ends by wheels, a transverse member interconnecting the intermediate portions of said side frames, other short transverse members carried by said side frames and projecting inwardly some distance from the respective side frames intermediate said transverse member and said wheels, a bolster sprung from said side frames by freely laterally swingable coil springs, longitudinal movement restraining means for said bolster, and brake mechanism associated with said wheels, said short transverse members serving as anchorages for the bolster supporting springs, the longitudinal movement restraining means and the brake mechanism.

7. In a railway truck, a pair of side frames supported at their ends by wheels, a transom interconnecting the central portions of side frames, a bolster sprung from said side frames by coil springs, said bolster having a low level center plate adjacent the horizontal plane of the wheel axes, and high level connections located a substantial distance above the center plate and interposed between the bolster and the respective side frames, said connections being cushioned to permit limited sidewise movement of the bolster with respect to the side frames, and being laterally and downwardly inclined to minimize roll.

CAROLUS L. EKSERGIAN.

REFERENCES CITED

The following references are of record in the file of this patent:

UNITED STATES PATENTS

| Number | Name | Date |
|---|---|---|
| 384,317 | Hubbard | June 12, 1888 |
| 450,627 | Krehbiel | Apr. 21, 1891 |
| 586,482 | Floyd | July 13, 1897 |
| 1,758,965 | O'Connor | May 20, 1930 |
| 2,128,281 | Blomberg | Aug. 30, 1938 |
| 2,168,293 | Kiesel | Aug. 1, 1939 |
| 2,250,568 | Borup | July 29, 1941 |
| 2,253,330 | Hersey et al. | Aug. 19, 1941 |
| 2,288,383 | Anderson | June 30, 1942 |
| 2,320,086 | Ledwinka | May 25, 1943 |
| 2,352,162 | Buckwalter | June 27, 1944 |
| 2,371,621 | Harwick | Mar. 20, 1945 |

FOREIGN PATENTS

| Number | Country | Date |
|---|---|---|
| 501,580 | Great Britain | Feb. 28, 1939 |